US012724874B2

(12) United States Patent
Sircar et al.

(10) Patent No.: US 12,724,874 B2
(45) Date of Patent: Sep. 1, 2026

(54) MALWARE PROCESS BLOCKING TECHNIQUE

(71) Applicant: Cylance Inc., Plano, TX (US)

(72) Inventors: Shiladitya Sircar, Ottawa (CA); Irene Melgarejo Lermas, Waterloo (CA)

(73) Assignee: Cylance Inc., Plano, TX (US)

( * ) Notice: Subject to any disclaimer, the term of this patent is extended or adjusted under 35 U.S.C. 154(b) by 0 days.

(21) Appl. No.: 18/973,529

(22) Filed: Dec. 9, 2024

(65) Prior Publication Data

US 2026/0161770 A1 Jun. 11, 2026

(51) Int. Cl.
*G06F 21/53* (2013.01)

(52) U.S. Cl.
CPC ........ *G06F 21/53* (2013.01); *G06F 2221/033* (2013.01)

(58) Field of Classification Search
None
See application file for complete search history.

(56) References Cited

U.S. PATENT DOCUMENTS

2020/0004957 A1* 1/2020 Chamaraju ............ G06N 20/00
2020/0120118 A1 4/2020 Shu et al.
2021/0067549 A1 3/2021 Chen et al.
2022/0188143 A1 6/2022 Scheepens et al.
2024/0241954 A1 7/2024 Wang et al.
2024/0305655 A1 9/2024 Liu et al.
2024/0354406 A1 10/2024 Belak et al.
2026/0161770 A1 6/2026 Sircar et al.

FOREIGN PATENT DOCUMENTS

WO WO-2018164701 A1 * 9/2018 ............ G06N 20/20
WO 2022239030 A1 11/2022

OTHER PUBLICATIONS

Li, Ce, et al.; "DMalNet: Dynamic Malware Analysis Based on API Feature Engineering and Graph Learning"; Computers & Security, vol. 122; Nov. 1, 2022; 17 pages.
Office Action dated May 4, 2026; U.S. Appl. No. 18/973,523, filed Dec. 9, 2024; 12 pages.
European Extended European Search Report; Application No. 25216380.3; May 19, 2026; 11 pages.
European Extended European Search Report; Application No. 25216394.4; May 19, 2026; 9 pages.
Liu, Chen, et al.; "MalAF: Malware Attack Foretelling From Run-Time Behavior Graph Sequence"; IEEE; Jul. 1, 2024; 16 pages.

* cited by examiner

*Primary Examiner* — William J. Goodchild
(74) *Attorney, Agent, or Firm* — Conley Rose, P.C.; J. Robert Brown, Jr.

(57) ABSTRACT

It is proposed a method for stopping or letting a process associated with an on-going event on a device by using a graph representation of the process, a prediction of the actions of the process to be performed on resources of the device by using a first trained model that outputs a predicted graph representation of the process, and a second trained model that delivers a score representative of the dangerousness of the process, the second trained model using the predicted graph representation of the process.

15 Claims, 5 Drawing Sheets

MALWARE PROCESS BLOCKING TECHNIQUE

TECHNICAL FIELD

The present disclosure relates to the detection of malwares running or being executed on a device.

BACKGROUND

In the field of cybersecurity, a malware is an active, running instance of a malicious software/program within a computer's operating system. Malwares are specifically designed to perform harmful actions, such as stealing data, disrupting system operations, or giving unauthorized access to an attacker. Usually, these malwares operate in the background and can mimic legitimate system processes to evade detection.

Hence, there is a need to develop techniques for preventing a malware (even during its execution) to perform some actions on resources of the device.

The proposed technique in this document can be used for this purpose.

DESCRIPTION OF DRAWINGS

Like reference numbers and designations in the various drawings indicate like elements.

DETAILED DESCRIPTION

Figure 1:
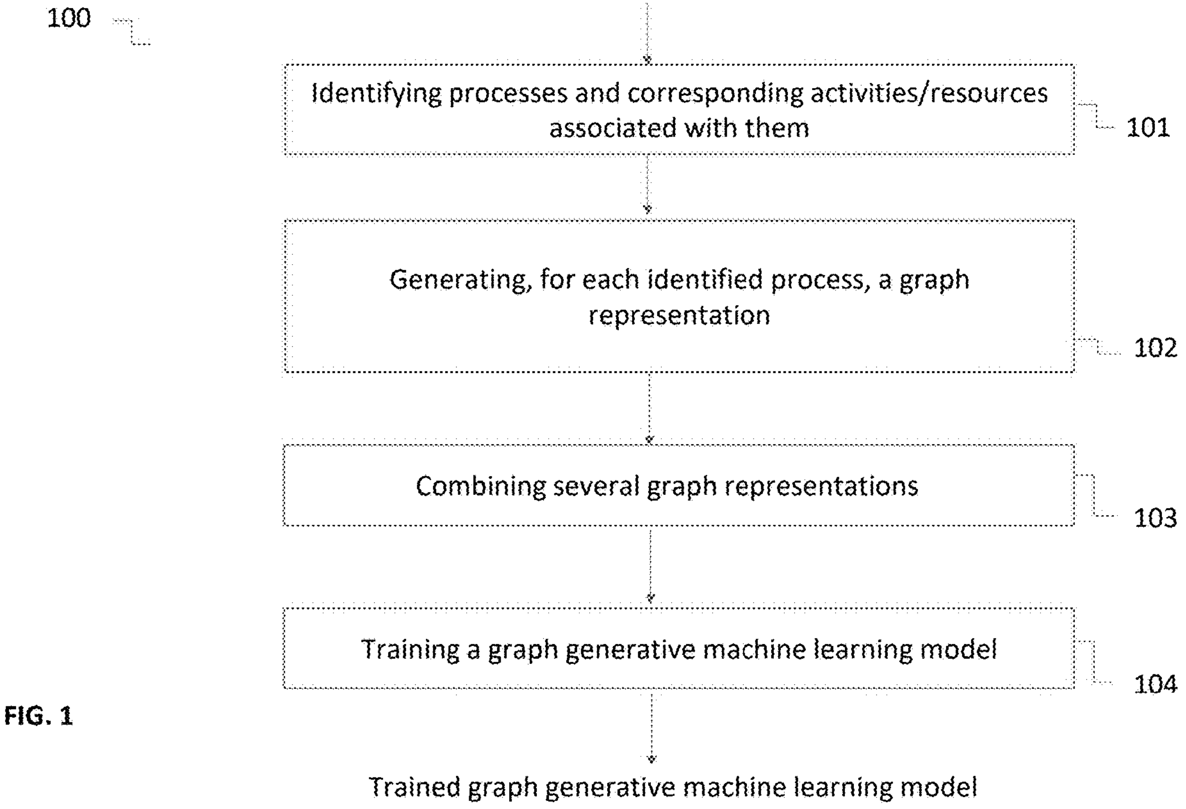
FIG. 1 is a flowchart showing an example operation for training a graph generative machine learning model, according to an implementation.

A malware can often be viewed as a sequence of processes. Indeed, many malware programs operate through a series of processes to achieve their objectives. This sequence can include multiple processes that either run consecutively or in parallel to evade detection, establish control, or carry out a specific payload. Hence, a malware can generate a sequence of processes. In one embodiment of the disclosure, the lineage or ancestry of processes is going to be used in tree form (with nodes and edges) in order to detect a malware. For reminders, a process is an instance of a program that is being executed by a computer's operating system. Each process has its own allocated memory and resources, and it operates independently of other processes (however these processes can communicate to each other's via Inter-Process Communication (IPC) mechanisms, and they can also share resources/artifacts such as network resource they connect or registry key they modify). A process includes the program's executable code, as well as other elements like a memory address space (i.e. the specific memory assigned to the process for its data and code), an execution context (which includes the process state (running, waiting, etc.), CPU registers, and program counter), resources (access to input/output files, devices, and any network connections the process might need) and a process ID (PID, which is a unique identifier assigned by the operating system).

Many types of malware begin as a single "dropper" process. This process is responsible for downloading or unpacking additional malicious components, such as other malware files or modules. Therefore this dropper process may generate new processes to extract or execute the main payload (the core malicious code that carries out the intended harm) as explained in the following.

Indeed, the initial malware process often launches a sequence of operations to gather information about the environment, such as the OS type, security software, and user permissions. If needed, the malware may execute processes to gain higher privileges to execute sensitive or restricted actions.

After gaining a foothold, the malware may spawn additional processes to download the main payload. These processes might include launching separate threads to run background tasks or manage communications with remote servers.

To ensure that the malware continues running even after reboots or shutdowns, it often sets up a persistence mechanism. This might include modifying system registry keys, creating scheduled tasks, or installing hidden services, all of which may appear as distinct processes.

Then, in a malicious activity execution stage, the malware actively performs its malicious tasks, such as data exfiltration, keylogging, or spreading across a network. Each of these activities could run in its own process, either in parallel or sequentially, depending on the malware's design.

Hence, one process associated with a malware may handle data exfiltration, another process associated with the same malware may handle keylogging, and yet another process associated with the same malware may communicate with a command-and-control (C&C) server. Some malwares (such as ransomware) can also launch encryption processes that scan and encrypt files across a system.

Some advanced malwares include processes for self-destruction or cleanup once their tasks are complete, leaving little to no trace on the infected system.

However, whatever the operations and sequence of actions carried out by different processes associated with a malware, the information relating to them can be recorded.

Indeed, several techniques are commonly used to capture detailed information about malware execution. For example, system event logs can be used to collect these information. In addition, process monitoring and tracing tools can list all running processes, including their memory usage, command line arguments, and network connections. Moreover, network traffic monitoring tools such as packet capture tools or firewall and intrusion detection/prevention logs can capture communications between processes associated with a malware and external servers. Other techniques related to API Monitoring (that can record calls to Windows APIs) or use of hooking techniques (that can capture low-level interactions) can also be used. At last, registry trackers can also be used to capture registry changes in Windows, logging modifications or additions that malware might make for persistence or obfuscation. In the following, the wording "raw data" is going to be used to cover the information/data captured according to these techniques. According to one implementation, the raw data is associated with a time slot or time period/range.

Figure 3:
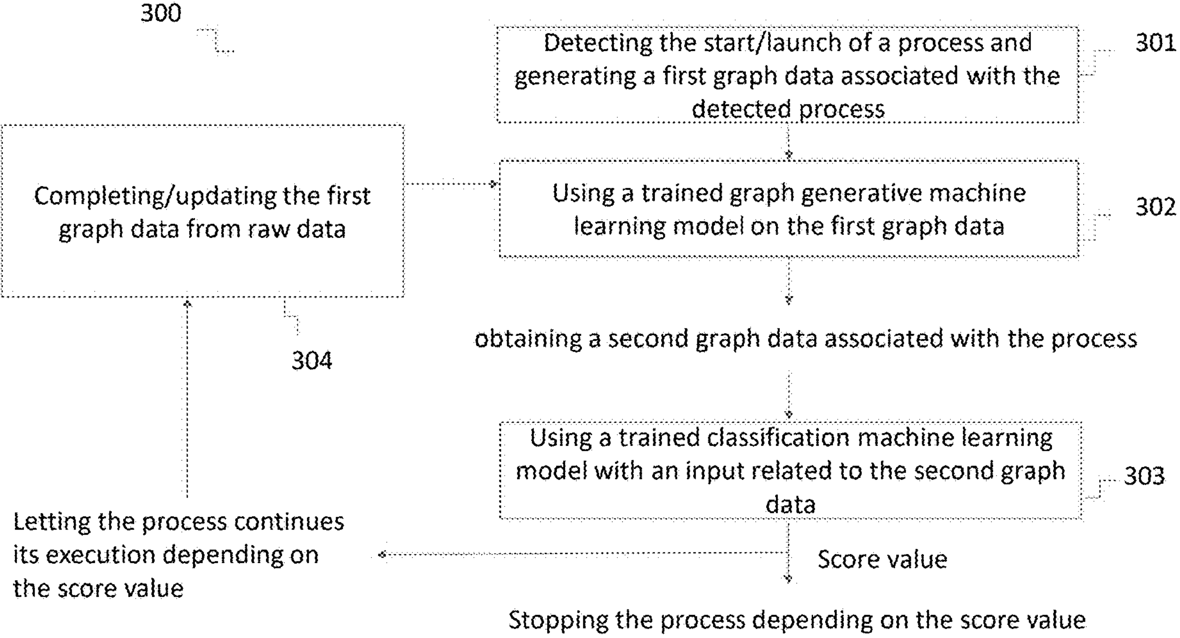
FIG. 3 is a flowchart showing an example method for blocking a malware event, the method relying on the use of two trained machine learning models, according to an implementation.

From the processing detailed in FIG. 3, a device is going to stop a process based on predicted actions or operations to be performed in a next time slot/period. This processing relies on the use of graph representations and the use of at least two different machine learning models.

In the following, the wording "event" is used to define the set/sequence of actions performed by one or several processes on different resources that can be related to the execution of a program (malicious or not). Hence, the execution of a malware (as described previously) can be viewed as a malware event or a malicious event. Therefore, in a sense, an event can be associated with one or several processes. In addition, an on-going event means an event that is not finished (i.e. the associated processes are still in an executing stage in the device).

FIG. 1 is a flowchart showing an example operation for training a graph generative machine learning model, according to an implementation. The example operation 100 shown in FIG. 1 can be implemented using additional, fewer, or different operations, which can be performed in the order shown or in a different order.

According to one embodiment of the disclosure, a device obtains raw data to be used for the training of a graph generative machine learning model.

In one implementation, the raw data has been collected from an "infected" device in the sense that it is known that one or several malware programs have been executed on this device. Therefore, labels can be used to ease the training of the graph generative machine learning model. In addition, the raw data can also correspond to data that have been collected from an "safe" device (in the sense that no malware program has been executed on this device). Here again, labels can be used to convey this information.

According to one implementation, in an identify step 101, a device identifies one or several processes in the raw data (at least by the detecting process information such as a name, ID, command line or parent process) and gets a list of activities and a list of used resources related to an execution of these identified processes. The raw data is associated with a time range during which the data from the use of various capture techniques were collected. The time range can be a range of several minutes (from one to sixty minutes for example), or a range of several hours (from one to three hours for example). The length of the time range is a parameter that can be configured according to one embodiment of the disclosure. For the training of a graph generative machine learning model, a sequence of raw data or historical raw data (from oldest to newest in time) is used, in which each bunch of raw data can be viewed as a data block (with collected data in the form of files for example) being associated with a same time slot or time period. Therefore, the steps 101, 102 and 103 have to be repeated for each bunch of raw data having a different time slot or time period (but with the same duration). In this way, the graph generative model to be trained will be able to learn the evolution of processes over time (in term of actions performed on resources over time).

Indeed, in a step 102, each identified process is represented in the form of a graph representation. A graph representation of a process comprises nodes and edges: the nodes are assigned with elements from the list of used resources of the process and/or an identifying value of an identified process (such as a name or an ID), and the edges are assigned with elements from the list of activities. The used resources can be related to memory space, files, hardware resources (processor, sensors, battery, components related to network connectivity, GPS, camera, etc.), IP addresses, ports, protocols, applications, system services. The activities are related to actions performed on the resources by a process such as allocating or deallocating memory, reading or writing data in a memory, creating or deleting files (such as system configuration registers) or directories, establishing a network connection (i.e. the resource can be a network interface card), sending or receiving data packets, listening for incoming connection, etc.

Therefore, the nodes and edges comprise rather non-numerical values (such as categorical labels or textual information). In a variant, each node and edge can be associated with a timestamp that can establish a chronology of actions performed by the process during the period associated with the raw data.

In a combining step 103, when processes are related to each other, the graph representations of these related processes are combined. For example, the combination can comprise the connecting of nodes of different graph representations of processes (such as the connecting of nodes comprising the identifying values of these processes). In the case where two graph representations of processes are combined, a value of 2 is assigned to a depth value. Thus, the depth value is a parameter that characterizes the number of processes linked together, making it possible to preserve the relationship (and the scheduling) of these processes represented in the form of graphs. Related processes can be due to the existence of Inter-Process Communication (IPC), or due to a parent-child relationship. Hence, a combined graph representation of processes can be viewed as a representation of an event. The combining can be done by analyzing specific information in the logs or traces that indicate process hierarchies, such as Process ID, parent process ID (PPID), timestamp, User ID (UID) or Session ID, event type (as some logs differentiate between different types of events, like process start, stop, or fork). In addition, the detection of command-line instructions in the raw data or the detection of fork system calls in the raw data or the detection of Inter-process communication (IPC) mechanisms in the raw data can enable the establishment of a hierarchy or a relationship between the processes, that can be reflected in the combined graph representation by linking or connecting graph representations of related processes. Then, the edges that connect different graph representations comprise information establishing or explaining the relationship between the connected processes. For example, in one embodiment of the disclosure the edge linking two graph representations of related processes can comprise a vector representation of a command-line instructions from the use of an embedding technique similar to Word2Vec but specifically designed for processing command-line instructions. For example, this embedding technique can rely on the use of a Skip-gram or Continuous Bag of Words (CBOW) model to predict context commands for a given command, capturing relationships between different commands.

The execution of steps 101, 102 and 103 for a sequence of bunch of raw data enables the generation of a sequence of snapshots of the evolving graph representations over time. In one embodiment of the disclosure, the use of timestamps associated with edges/nodes can provide a finer granularity with respect to the execution of processes.

In a step 104, the one or several combined graph representations of processes, as well as single graph representations of some processes (which are not connected/related to other processes) are provided as inputs for the training of a graph generative machine learning model.

A data splitting process can be executed on these inputs in order to obtain a training set and a testing set. The training set is used to train the model, while the testing set is used to evaluate its performance.

According to one embodiment of the disclosure, different models can be chosen to be trained. Indeed, different architectures can be used. For example, the graph generative machine learning model can rely on a Dynamic Graph Neural Network (DGNN), or a Graph Recurrent Neural Network (Graph-RNN).

The goal/aim of the trained graph generative machine learning model is to generate, from a given graph representation, another graph representation that completes/develops/expands the graph structure of the given graph representation for a next time period/range. The expansion of graph representation can comprise the addition of edges and/or nodes. Therefore, this another graph representation comprises future actions on resources that may/might occur in this next time period/range by the corresponding process or processes. In a variant, a number of future actions predicted by the trained graph generative machine learning model can be limited to a value comprised between a range from one to eight. In one implementation, each added edges and/or nodes is associated with a scores of occurrence or a probability of occurrence. In another implementation, each added edges and/or nodes is associated with a timestamp. This makes it possible to specify the order of execution of future actions within this next time period/range.

The way in which the parameters and hyperparameters of each model are chosen is not described in the present document. But one skilled in the art would understand that based on the results of the training of these models, modification of these parameters and hyperparameters is done to obtain better results. Indeed, in order to determine these parameters and hyperparameters, comparison of results has to be done. Factors such as the number of layers, the number of neurons per layer, the activation functions, and the optimization algorithm has an important impact on the behavior of a model. This is the purpose of fine tuning which is beyond the scope of the present document.

Once a model architecture is chosen, the model training 104 is performed by using the training dataset, the use of a loss function that measures the discrepancy between the model's predictions and the true values, and the use of an optimization algorithm (e.g., gradient descent) to update the parameters (weights) iteratively to minimize the loss function. Indeed, during the model training, the internal parameters (weights and biases) are modified in order to minimize the difference between the predictions of the model and the actual values in the training data.

The model training 104 further comprises an evaluation step that evaluate the trained model on the testing dataset to assess its performance. Based on the results, either model refinement can be done (i.e. such as the adjustment of the hyperparameters of the model) or the training process can stop at this stage if the performance metrics fulfill a stopping criteria.

Figure 4:
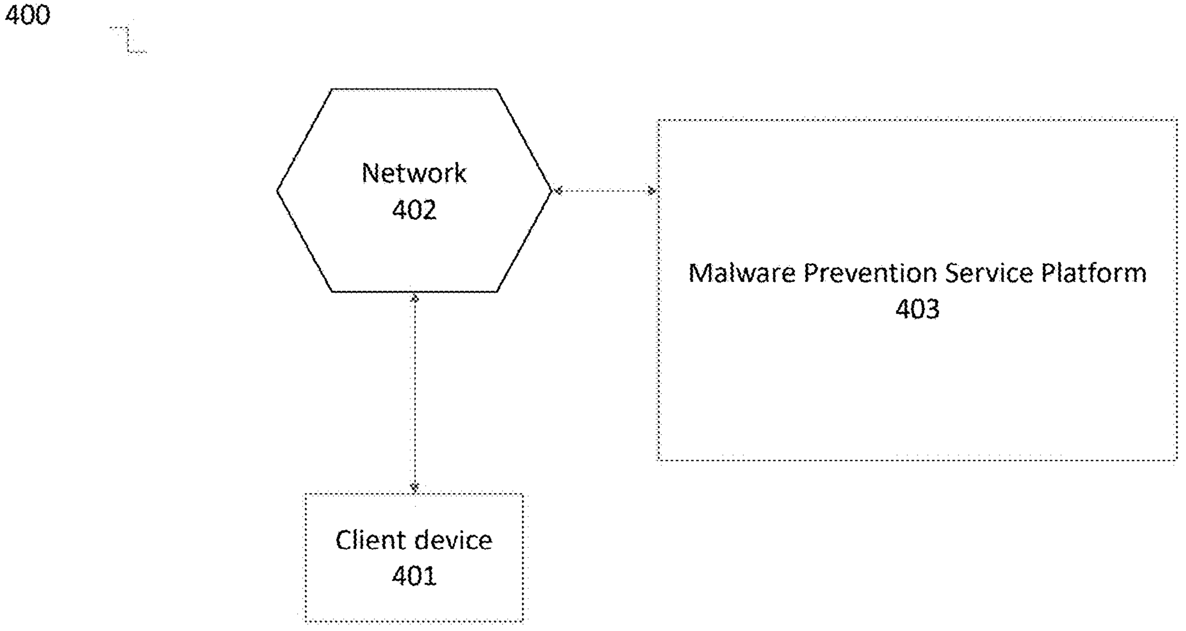
FIG. 4 depicts a schematic diagram showing an example system that provides a malware blocking technique according to an implementation.

In one embodiment, once a trained graph generative machine learning model is obtained, it can be deployed to a malware prevention service platform described in FIG. 4.

The training process and deployment of a trained graph generative machine learning model can be reiterated regularly based on parameters of a security policy, the parameters defining for example a time range or frequency at which to carry out the training. In other case, a security alarm can be the event that trigger the launch of a new training of the one or several models.

Figure 2:
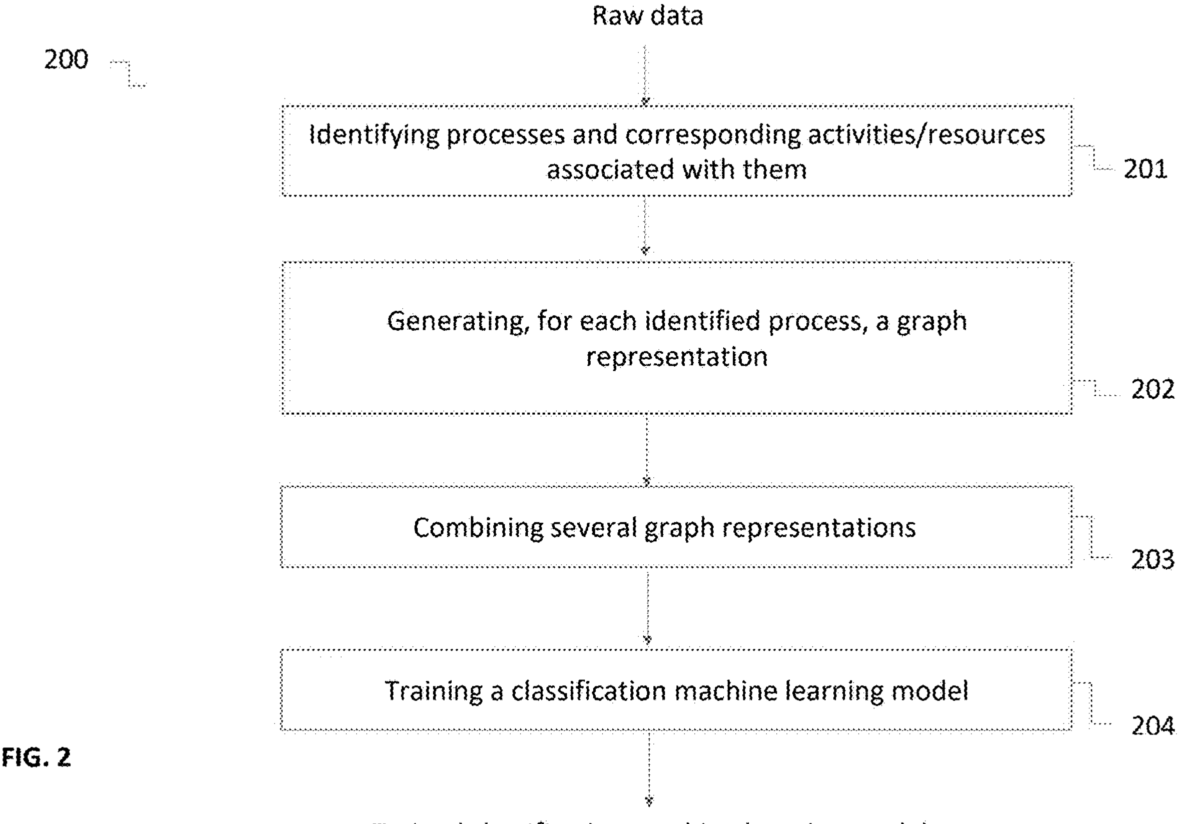
FIG. 2 is a flowchart presenting an example method for training a classification machine learning model to be used as a malware classification model or as a malware identification model.

FIG. 2 is a flowchart presenting an example method for training a classification machine learning model to be used as a malware classification model.

The training of a classification machine learning model requires the generation of graph representations of processes as done by the execution of steps 101, 102 and 103. Therefore, the steps 201, 202 and 203 are the same as the steps 101, 102 and 103. However, the training of a classification machine learning model is slightly different in the sense that the graph representations are modified or converted as explained in the following.

Indeed, in one implementation, the nodes and edges that comprise text (e.g., tags, labels) are converted by text embeddings techniques such as Word2Vec, GloVe, or transformer-based embeddings (e.g., BERT) into numerical vectors. Hence, each node or edge can be associated with a numerical value. In a variant, a timestamp can also be associated with nodes and/or edges.

In one embodiment of the disclosure, a device can perform a vectorization step that converts each of the graph representations of processes (either combined graph representations or single graph representations of some processes (which are not connected/related to other processes)) into a vector.

According to one implementation, the vectorization step comprises the use of graph embedding techniques to convert the numerical values associated with nodes and edges into a vector with a fixed-length (i.e. each graph representation is converted into a fixed-length vector, whatever the size/depth of the graph representation is).

In a variant, the vectorization step can rely on a trained model having one of the following architectures: a Graph Neural Network (GNN) such as a Graph Attention Network (GAT), a Relational Graph Convolutional Networks (R-GCN), or a Message Passing Neural Network (MPNN) which are designed to handle both node embeddings and edge embeddings. Indeed, in these architecture, edge embeddings and node embeddings can be processed together. For example, by concatenating or aggregating the edge embeddings and node embeddings based on their position in the graph representation. Then, a pooling function or a readout function can be used in order to obtain a fixed-length vector of a graph representation.

In a variant, graph embedding techniques can be combined with the use of random projections (which is a dimensionality reduction technique where the high-dimensional vectors (obtained from the processing of the graph representation of processes) are projected onto a lower-dimensional subspace using a random matrix). It should be noted that the use of random projections can be done on the node embeddings themselves before executing pooling methods. Hence, the pooling methods are performed on the reduced node/edge embeddings according to this embodiment. In a variant, the use of random projections can be done on the vectors resulting from the execution of pooling methods on the node/edge embeddings. Whatever the approach chosen, we can say in a sense that we can obtain a set of reduced vectors according to these approaches (the reduction resulting from the use of random projections).

Therefore, from a set of graph representations of processes, a set of vectors is obtained, each vector having a same length/size.

In a variant, the vectorization step can rely on the use of a trained graph autoencoder (GAE). Indeed, a trained graph autoencoder comprises an encoder that maps a graph representation to a latent space, and the trained graph autoencoder also comprises a decoder that reconstructs the graph representation from this latent representation. However, in the vectorization step, only the encoder from the trained graph autoencoder is used. Hence, from a set of graph representations of processes, a set of vectors (outputted by the encoder of a trained graph autoencoder) is obtained.

The goal of a trained malware classification machine learning model is to generate, from a given graph representation, a score value which indicates the malicious potential of the corresponding process/processes/event.

From the set of vectors, and labels (as it is possible to know which type of malware process has been executed on the device for training purposes), it is possible to train a malware classification machine learning model as follows.

A data splitting process can be executed in order to divide a given set of vectors into a training set and a testing set. The training set is used to train the model, while the testing set is used to evaluate its performance.

According to one embodiment of the disclosure, different model can be chosen to be trained for classification purpose. For example, a feedforward neural network (FNN), also called a multi-layer perceptron (MLP), can be used. In a variant, a Convolutional Neural Networks (CNNs) can be chosen to be trained. In another variant, Recurrent Neural Networks (RNNs) or Long Short-Term Memory (LSTM) Networks can be chosen. Moreover, other architectures relying on the use of transformers or hybrid approaches relying on the use of an MLP combined with autoencoders can be chosen. The way in which the parameters and hyperparameters of each model are chosen is not described in the present document. But one skilled in the art would understand that based on the results of the training of these models, modification of these parameters and hyperparameters is done to obtain better results. Indeed, in order to determine these parameters and hyperparameters, comparison of results has to be done. Factors such as the number of layers, the number of neurons per layer, the activation functions, and the optimization algorithm has an important impact on the behavior of a model. This is the purpose of fine tuning which is beyond the scope of the present document.

Once a model architecture is chosen, the model training 204 is performed by using the training dataset, the use of a loss function that measures the discrepancy between the model's predictions and the true values, and the use of an optimization algorithm (e.g., gradient descent) to update the parameters (weights) iteratively to minimize the loss function. Indeed, during the model training, the internal parameters (weights and biases) are modified in order to minimize the difference between the predictions of the model and the actual values in the training data.

The model training 204 further comprises an evaluation step that evaluate the trained model on the testing dataset to assess its performance. Based on the results, either model refinement can be done (i.e. such as the adjustment of the hyperparameters of the model) or the training process can stop at this stage if the performance metrics fulfill a stopping criteria.

In one embodiment, once a trained malware classification machine learning model is obtained/generated, it can be deployed to a malware prevention service platform described in FIG. 4.

The training process and deployment of a trained malware classification machine learning model can be reiterated regularly based on parameters of a security policy, the parameters defining for example a time range or frequency at which to carry out the training. In other case, a security alarm can be the event that trigger the launch of a new training of the one or several models.

In a variant, several malware classification machine learning models are trained (each trained model having a different type of architecture). Then, an averaging operation can be used on the different score values outputted by these models in order to get a unique score value.

FIG. 3 is a flowchart showing an example method for blocking a malware event, the method relying on the use of two trained machine learning models, according to an implementation.

In a step 301, once a process is launched on a device, a graph representation of the process is generated by a malware prevention service platform described in FIG. 4. The root node of this graph representation can be associated with a value related to a process identifier and/or a process name and/or a command line that was used to start/launch the process.

Then, the malware prevention service platform can use, in a step 302, a trained graph generative machine learning model (as the one obtained from the execution of the process described in FIG. 1) to get a graph representation of this process for a future time period.

In a step 303, the malware prevention service platform can use a trained classification machine learning model (as the one obtained from the execution of the process described in FIG. 2) to get a score associated with this graph representation of this process for the future time period. This score is an indication of the potential danger of the presumed actions to be performed on resources during this future time period.

Depending on the value of the score (for example by comparing it with a threshold), the malware prevention service platform can either block/stop the process (if it is considered as dangerous for the device running it) or let the process continues (meaning that the alleged actions do not appear to pose a risk for the executing device).

If the process continues to be executed, only the actions that are performed during a time range similar to the future time period are allowed to be done. In a variant only a sequence of two to eight actions is allowed to be done. The execution of these actions on resources gives rise to an update of the graph representation of the process. This updated version of the graph representation of the process is then provided as an input to the trained graph generative machine learning model in order to get the graph representation of this process for another future time period. Here again the output of the trained graph generative machine learning model is transferred to the trained classification machine learning model to get a score. As previously, this score is analyzed, and either the process continues or is blocked. These steps are reiterated until either the process is stopped due to the score value obtained by the trained classification machine learning model, or the process finishes in a conventional way.

Therefore, the process depicted in FIG. 3 stops a process or processes linked to a malware program without compromising the integrity of the device.

FIG. 4 depicts a schematic diagram showing an example system that provides a malware prevention technique according to an implementation. More precisely, the system 400 includes a malware prevention service platform 403 that is communicatively coupled with a client device 401 over a network 402. The client device 401 represents an electronic device that provides raw data to be analyzed or combined graph representations or similar data. In some cases, the client device 401 can send a file comprising these raw data to the malware prevention service platform 403. In some cases, the malware prevention service platform 403 execute the process of FIG. 3 and sends the instructions (concerning the blocking or the continuation of the process) to the client device 401.

The malware prevention service platform 403 represents an application, a set of applications, software, software modules, hardware, or any combination thereof, that can control the realization of a malware event. The malware prevention service platform 403 can be an application server, a service provider, or any other network entity. The malware prevention service platform 403 can be implemented using one or more computers, computer servers, or a cloud-computing platform. The malware prevention service platform 403 can be used to run trained machine learning models as those mentioned in FIG. 3. In a variant, the malware prevention service platform 403 can also perform the training process discussed in FIGS. 1-2. In a variant, the malware prevention service platform 403 is executed in the client device 401 itself. Indeed, more and more client devices, thanks to technological developments, are capable of running trained machine learning models locally. For example, iPhones that can be viewed as client devices are suitable for running machine learning models locally as they provide a core machine learning framework, a dedicated chip component such as the Apple neural engine (ANE) optimized for performing machine learning tasks.

Turning to a general description, the client device 401 may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term “mobile device” can also refer to any hardware or software component that can terminate a communication session for a user. In addition, the terms “user equipment,” “UE,” “user equipment device,” “user agent,” “UA,” “user device,” and “mobile device” can be used interchangeably herein.

The example system 400 includes the network 402. The network 402 represents an application, set of applications, software, software modules, hardware, or combination thereof, that can be configured to transmit data messages between the entities in the example system 400. The network 402 can include a wireless network, a wireline network, the Internet, or a combination thereof. For example, the network 402 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

While elements of FIG. 4 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 5:
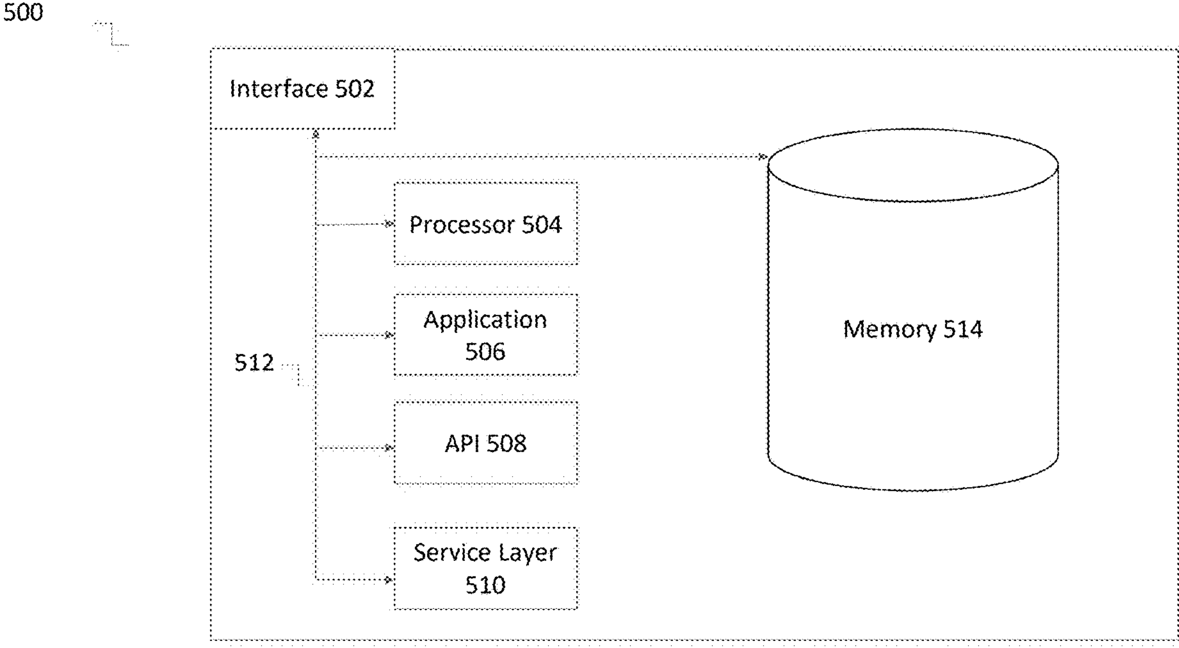
FIG. 5 illustrates a high-level architecture block diagram of a computer according to an implementation.

FIG. 5 illustrates a high-level architecture block diagram of a computer 500 according to an implementation. The computer 500 can be implemented as the client device 501, the event service platform 504, or any combinations thereof. The computer 500 can also be used to implement the operations discussed in FIGS. 1-3. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

In some cases, the steps of FIGS. 1-3 can be implemented in an executable computing code, e.g., C/C++ executable codes. In some cases, the computer 500 can include a standalone Linux system that runs batch applications. In some cases, the computer 500 can include mobile or personal computers.

The computer 500 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 500 can serve as a client, network component, a server, a database, or other persistency, and/or any other components. In some implementations, one or more components of the computer 500 may be configured to operate within a cloud-computing-based environment.

At a high level, the computer 500 is an electronic computing device operable to receive, transmit, process, store, or manage data. According to some implementations, the computer 500 can also include or be communicably coupled with an application server, e-mail server, web server, caching server, streaming data server, business intelligence (BI) server, and/or other server.

The computer 500 can collect data of network events or mobile application usage events over network 502 from a web browser or a client application, e.g., an installed plugin. In addition, data can be collected by the computer 500 from internal users (e.g., from a command console or by another appropriate access method), external or third parties, other automated applications, as well as any other appropriate entities, individuals, systems, or computers.

Each of the components of the computer 500 can communicate using a system bus 512. In some implementations, any and/or all the components of the computer 500, both hardware and/or software, may interface with each other and/or the interface 502 over the system bus 512 using an Application Programming Interface (API) 508 and/or a service layer 510. The API 508 may include specifications for routines, data structures, and object classes. The API 508 may be either computer language-independent or -dependent and refer to a complete interface, a single function, or even a set of APIs. The service layer 510 provides software services to the computer 500. The functionality of the computer 500 may be accessible for all service consumers using this service layer. Software services, such as those provided by the service layer 510, provide reusable, defined business functionalities through a defined interface. For example, the interface may be software written in JAVA, C++, or other suitable languages providing data in Extensible Markup Language (XML) format or other suitable format. While illustrated as an integrated component of the computer 500, alternative implementations may illustrate the API 508 and/or the service layer 510 as stand-alone components in relation to other components of the computer 500. Moreover, any or all parts of the API 508 and/or the service layer 510 may be implemented as child or sub-modules of another software module, enterprise application, or hardware module without departing from the scope of this disclosure.

The computer 500 includes an interface 502. Although illustrated as a single interface 502 in FIG. 5, two or more interfaces 502 may be used according to particular needs, desires, or particular implementations of the computer 500. The interface 502 is used by the computer 500 for communicating with other systems in a distributed environment connected to a network (whether illustrated or not). Generally, the interface 502 comprises logic encoded in software and/or hardware in a suitable combination and operable to communicate with the network. More specifically, the interface 502 may comprise software supporting one or more communication protocols associated with communications such that the network or interface's hardware is operable to communicate physical signals within and outside of the computer 500.

The computer 500 includes at least one processor 504. Although illustrated as a single processor 504 in FIG. 5, two or more processors may be used according to particular needs, desires, or particular implementations of the computer. Generally, the processor 504 executes instructions and manipulates data to perform the operations of the computer 500. Specifically, the processor 504 executes the functionality disclosed in FIGS. 1-3.

The computer 500 also includes a memory 514 that holds data for the computer 500. Although illustrated as a single memory 514 in FIG. 5, two or more memories may be used according to particular needs, desires, or particular implementations of the computer 500. While memory 514 is illustrated as an integral component of the computer 500, in alternative implementations, memory 514 can be external to the computer 500.

The application 506 is an algorithmic software engine providing functionality according to particular needs, desires, or particular implementations of the computer 500, particularly with respect to functionality required for anomaly detection. Although illustrated as a single application 506, the application 506 may be implemented as multiple applications 506 on the computer 500. In addition, although illustrated as integral to the computer 500, in alternative implementations, the application 506 can be external to the computer 500.

There may be any number of computers 500 associated with, or external to, and communicating over a network. Furthermore, this disclosure contemplates that many users may use one computer 500, or that one user may use multiple computers 500.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a standalone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer readable media for storing computer program instructions and data can include all forms of permanent/non-permanent or volatile/non volatile memory, media and memory devices, including by way of example semiconductor memory devices, for example, random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto optical disks; and optical memory devices, for example, digital versatile/video disc (DVD), compact disc (CD) ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Described implementations of the subject matter can include one or more features, alone or in combination.

For example, in an implementation, it is proposed a first feature that deals with a method for stopping an on-going event associated with at least one process executed on a device, the method comprising:

generating, at a start of a process on a device, a root node of a graph representation associated with the on-going event, wherein the root note is associated with a value related to a process identifier and/or a process name and/or a command line that was used to start the process, and wherein the graph representation comprises other nodes and edges to be determined, the other nodes to be determined being chosen amongst a list of resources and/or information related to another process to be launched, and the edges to be determined being chosen amongst a list of activities, the resources and the activities being both related to a potential behavior of the process;

determining a list of predictions of values for nodes and edges that the process may perform in a next time slot, the determining comprising providing the graph representation to a first trained model, the first trained model outputting a predicted graph representation, wherein the list of predictions of values for nodes and edges further comprising scores of occurrences in the next time slot;

providing the predicted graph representation to a second trained model, the second trained model outputting a score whose value depends on the dangerousness of the predicted actions; stopping the on-going event in the case that the score belongs to a range wherein dangerousness of the predicted actions is considered significant; and letting the process continues its execution in the case that the score belongs to a range wherein dangerousness of the predicted actions is considered not significant.

A second feature, combinable with any of the previous or following features, relates to a method for stopping an on-going event, wherein in the case that the process continues its execution, it further comprises completing the graph representation associated with the on-going event according to the resources used and the actions performed in the next time slot, the completing being done before executing again steps of determining, providing and blocking or letting.

A third feature, combinable with any of the previous or following features, relates to a method for stopping an on-going event, wherein the first trained model is a temporal graph convolutional network model.

A fourth feature, combinable with any of the previous or following features, relates to a method for stopping an on-going event, wherein resources are related to hardware resources and/or software resources of the device and/or other devices, and wherein activities are related to actions performed on the hardware resources and/or software resources.

A fifth feature, combinable with any of the previous or following features, relates to a method for stopping an on-going event, wherein the information related to another process to be launched is related to command-line instructions, fork system calls or Inter-process communication (IPC) mechanisms.

A sixth feature, combinable with any of the previous or following features, relates to a method for stopping an on-going event, wherein a size of the list of predictions of values for nodes is comprised between 1 and 8, and a size of the list of predictions of values for edges is comprised is comprised between 1 and 8.

Accordingly, the previously described example implementations do not define or constrain the present disclosure. Other changes, substitutions, and alterations are also possible without departing from the scope of the present disclosure.

In a variant, features previously mentioned can be implemented either in hardware or as a computer program.

In one embodiment of the disclosure, it is proposed a method for stopping or letting a process associated with an on-going event (related to a plurality of other processes) on a device by using a graph representation of the process, a prediction of the actions of the process to be performed on resources of the device by using a first trained model that outputs a predicted graph representation of the process, and a second trained model that delivers a score representative of the dangerousness of the process, the second trained model using the predicted graph representation of the process.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

At last, according to an embodiment, some machine learning models can be run on Central Processing Unit (CPU) that are general-purpose processors that handle most types of computing tasks. In a variant, Graphics Processing Unit (GPU) which are specialized hardware designed for parallel computing can be used to run or train machine learning models mentioned in this document. Moreover, in a variant, Tensor Processing Unit (TPU) can be used. Therefore a device that comprises at least one of these different processors can execute part of the processes that involve the use of machine learning models.

What is claimed is:

1. A computer-implemented method for stopping an on-going event associated with at least one process executed on a device, the method comprising:

generating, at a start of a process on a device, a root node of a graph representation associated with the on-going event, wherein the root note is associated with a value related to a process identifier and/or a process name and/or a command line that was used to start the process, and wherein the graph representation comprises other nodes and edges to be determined, the other nodes to be determined being chosen amongst a list of resources and/or information related to another process to be launched, and the edges to be determined being chosen amongst a list of activities, the resources and the activities being both related to a potential behavior of the process;

determining a list of predictions of values for nodes and edges that the process may perform in a next time slot, the determining comprising providing the graph representation to a first trained model, the first trained model outputting a predicted graph representation, wherein the list of predictions of values for nodes and edges further comprising scores of occurrences in the next time slot;

providing the predicted graph representation to a second trained model, the second trained model outputting a score whose value depends on a dangerousness of predicted actions;

stopping the on-going event in the case that the score belongs to a range wherein the dangerousness of predicted actions is considered significant; and letting the process continues its execution in the case that the score belongs to a range wherein the dangerousness of predicted actions is considered not significant.

2. The computer-implemented method of claim 1, wherein in the case that the process continues its execution, it further comprises completing the graph representation associated with the on-going event according to used resources and actions performed in the next time slot, the completing being done before executing again steps of determining, providing and blocking or letting.

3. The computer-implemented method of claim 1, wherein the first trained model is a temporal graph convolutional network model.

4. The computer-implemented method of claim 1, wherein resources are related to hardware resources and/or software resources of the device and/or other devices, and wherein activities are related to actions performed on the hardware resources and/or software resources.

5. The computer-implemented method of claim 1, wherein the information related to another process to be launched is related to command-line instructions, fork system calls or Inter-process communication (IPC) mechanisms.

6. The computer-implemented method of claim 1, wherein a size of the list of predictions of values for nodes is comprised between 1 and 8, and a size of the list of predictions of values for edges is comprised is comprised between 1 and 8.

7. A computer-readable medium containing instructions which, when executed, cause an electronic device to perform operations for stopping an on-going event associated with at least one process executed on a device, the operations for stopping an on-going event comprising:

generating, at a start of a process on a device, a root node of a graph representation associated with the on-going event, wherein the root note is associated with a value related to a process identifier and/or a process name and/or a command line that was used to start the process, and wherein the graph representation comprises other nodes and edges to be determined, the other nodes to be determined being chosen amongst a list of resources and/or information related to another process to be launched, and the edges to be determined being chosen amongst a list of activities, the resources and the activities being both related to a potential behavior of the process;

determining a list of predictions of values for nodes and edges that the process may perform in a next time slot, the determining comprising providing the graph representation to a first trained model, the first trained model outputting a predicted graph representation, wherein the list of predictions of values for nodes and edges further comprising scores of occurrences in the next time slot;

providing the predicted graph representation to a second trained model, the second trained model outputting a score whose value depends on a dangerousness of predicted actions;

stopping the on-going event in the case that the score belongs to a range wherein the dangerousness of the predicted actions is considered significant; and letting the process continues its execution in the case that the score belongs to a range wherein the dangerousness of predicted actions is considered not significant.

8. The computer-readable medium of claim 7, wherein, in the case that the process continues its execution, the operations further comprise completing the graph representation associated with the on-going event according to used resources and actions performed in the next time slot, the completing being done before executing again steps of determining, providing and blocking or letting.

9. The computer-readable medium of claim 7, wherein the first trained model is a temporal graph convolutional network model.

10. The computer-readable medium of claim 7, wherein resources are related to hardware resources and/or software resources of the device and/or other devices, and wherein activities are related to actions performed on the hardware resources and/or software resources.

11. The computer-readable medium of claim 7, wherein the information related to another process to be launched is related to command-line instructions, fork system calls or Inter-process communication (IPC) mechanisms.

12. The computer-readable medium of claim 7, wherein a size of the list of predictions of values for nodes is comprised between 1 and 8, and a size of the list of predictions of values for edges is comprised is comprised between 1 and 8.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for stopping an on-going event associated with at least one process executed on a device, the one or more operations comprising:

generating, at a start of a process on a device, a root node of a graph representation associated with the on-going event, wherein the root note is associated with a value related to a process identifier and/or a process name and/or a command line that was used to start the process, and wherein the graph representation comprises other nodes and edges to be determined, the other nodes to be determined being chosen amongst a list of resources and/or information related to another process to be launched, and the edges to be determined being chosen amongst a list of activities, the resources and the activities being both related to a potential behavior of the process;

determining a list of predictions of values for nodes and edges that the process may perform in a next time slot, the determining comprising providing the graph representation to a first trained model, the first trained model outputting a predicted graph representation, wherein the list of predictions of values for nodes and edges further comprising scores of occurrences in the next time slot;

providing the predicted graph representation to a second trained model, the second trained model outputting a score whose value depends on a dangerousness of predicted actions;

stopping the on-going event in the case that the score belongs to a range wherein the dangerousness of predicted actions is considered significant; and letting the process continues its execution in the case that the score belongs to a range wherein the dangerousness of predicted actions is considered not significant.

14. The computer-implemented system of claim 13, wherein in the case that the process continues its execution, the one or more operations further comprises completing the graph representation associated with the on-going event according to used resources and actions performed in the next time slot, the completing being done before executing again steps of determining, providing and blocking or letting.

15. The computer-implemented system of claim 13, wherein the first trained model is a temporal graph convolutional network model.

* * * * *